Feb. 5, 1924.

R. L. WYCKOFF

VALVE EXTRACTOR FOR WELLS

Filed Jan. 18, 1923

1,483,036

Inventor
R. L. Wyckoff

By F. K. Bryant
Attorney

Patented Feb. 5, 1924.

1,483,036

UNITED STATES PATENT OFFICE.

ROBERT L. WYCKOFF, OF INDEPENDENCE, KANSAS.

VALVE EXTRACTOR FOR WELLS.

Application filed January 18, 1923. Serial No. 613,546.

*To all whom it may concern:*

Be it known that I, ROBERT L. WYCKOFF, a citizen of the United States of America, residing at Independence, in the county of Montgomery and State of Kansas, have invented certain new and useful Improvements in Valve Extractors for Wells, of which the following is a specification.

This invention relates to certain new and useful improvements in valve extractors for wells and is especially designed for use in connection with deep water or oil wells and is so constructed for cooperation with a valve cage disposed at the lower end of the well for pounding or jarring the same for the purpose of removing obstructions, such as sand from the valve and its seat to permit proper seating operation of the valve.

The primary object of the invention resides in the provision of a valve extractor for wells wherein the extractor tool has a depending screw bolt extension upon which a screw block is threaded for centering the extension screw for retention in a threaded socket formed at the upper end of the valve cage with cooperating pawl and ratchet devices carried by the screw block and threaded extension of the tool extractor.

With the above and other objects in view as the nature of the invention is better understood, the same consists of the novel form, combination and arrangement of parts hereinafter more fully described, shown in the accompanying drawing and claimed.

Figure 1:
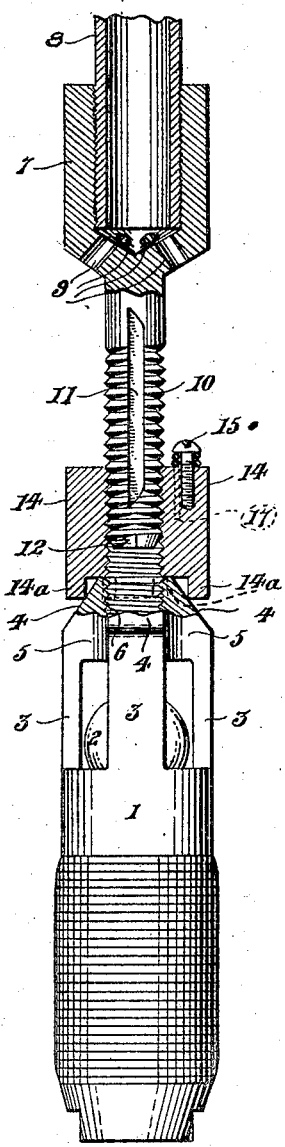
Figure 2:
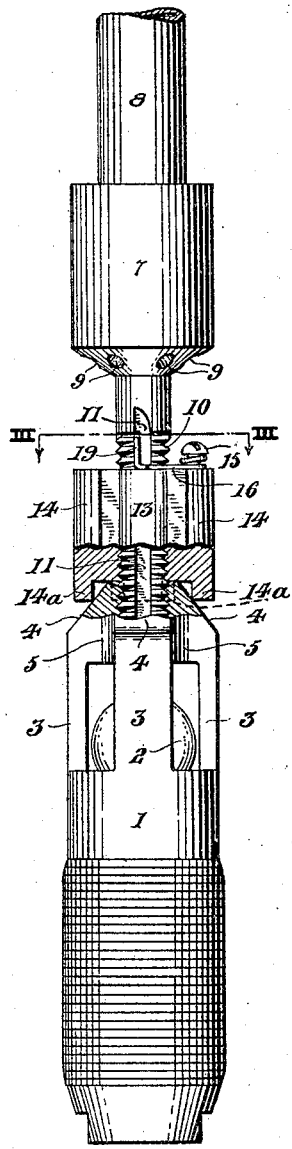
Figure 3:
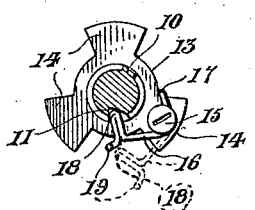
Figure 4:
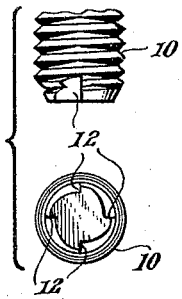

In the drawing, wherein like reference characters designate corresponding parts throughout the several views, Figure 1 is a longitudinal sectional view of a valve extractor for wells constructed in accordance with the present invention, the valve cage being shown in elevation, and partly in section with the extractor operatively positioned thereabove, Figure 2 is a side elevational view, partly in section showing the screw bolt extension at the lower end of the extractor threaded into the upper end of the valve cage and the cooperating pawl and ratchet carried by the screw block or nut and the screw extension, Figure 3 is a cross-sectional view taken on line III—III of Fig. 2 showing the tensioned pawl carried by the screw block engaging a longitudinal side groove in the screw bolt extension, and Figure 4 shows a fragmentary side elevational view, and a bottom plan view of the lower end of the screw bolt extension of the extractor.

Referring more in detail to the accompanying drawing, the standing valve that is located at or near the bottom of the well includes a casing 1 provided with a valve cage that encloses a ball valve 2, the cage consisting of side bars 3 connected at their upper ends by a conical head 4 having spaced side depressions 5 as clearly shown in Fig. 1, the conical head 4 having an internally threaded axial bore 6 for purposes presently to appear.

The extractor includes a shell 7 internally threaded for the reception of a working valve pipe 8, the bottom wall of the shell being of conical formation and provided with a plurality of spaced ports 9 and further carrying a depending elongated screw 10 having a longitudinally extending ratchet groove 11 formed in one side thereof, while the lower terminal end of the screw 10, as shown in Fig. 4 has a reaming edge 12 for purposes of cleaning the threaded bore 6 of the valve cage head and insuring proper engagement of the screw 10 with the valve casing.

A nut or screw block 13 is threaded on the screw 10 and is provided with a plurality of outwardly directed ribs 14 having lower extensions 14ᵃ projecting below the lower edge of the screw blocks 13 that are adapted to be received in the grooves 5 of the valve cage head 4 during the coupling of the extractor to the valve cage.

A pawl is carried by the screw block 13 for engagement with the ratchet groove 11 in the screw 10. A set screw or pin 15 is threaded into the upper end of one of the ribs 14 for anchoring the coiled portion of a wire pawl 16. The leg 17 of this pawl engages one side of the adjacent rib 14 while the other leg is bent to provide a ratchet 18 with the terminal end thereof forming a finger grip 19. The ratchet 18 engages in the ratchet groove 11 as shown in Figs. 2 and 3.

In positioning the extractor in a well, the screw block 13 is lowered to the position shown in Fig. 1 with the lower end 12 of the screw 10 positioned upwardly of the lower edge of the screw block and by reciprocating the extractor the valve casing 1 may be pounded or jarred thereby for purposes of freeing sand or other matter from the seat of the valve cage and ball valve 2, the conical head 4 of the valve cage centering the same in the extractor. When it is desired to remove the valve cage, the screw block 13 is positioned in contact with the conical head 4 of the valve cage with the depending ends 14ª of the ribs 14 positioned in the side grooves 5, rotation of the shell 7 of the extractor carrying the screw 10 causing the screw to be lowered through the screw block 13 for threaded reception in the threaded bore 6 of the valve cage as shown in Fig. 2, retrograde movement of the screw block being prevented by the pawl and ratchet device above described. After the valve cage 1 has been removed from the well, the finger piece 19 of the pawl 16 may be engaged to remove the ratchet 18 from the groove 11 permitting free rotation of the screw 10 in the block 13 to disconnect the valve cage from the extractor. By the provision of the type of pawl and ratchet device disclosed herein, the screw block 13 is prevented from movement relative to the screw 10 during the pounding operation in connection with the valve cage 1, thereby protecting the threads on the lower end of the screw 10 as well as the threads in the bore 6 of the valve cage.

While there is herein shown and described the preferred embodiment of the present invention, it is nevertheless to be understood that minor changes may be made therein without departing from the spirit and scope of the invention as claimed.

What is claimed as new is:—

1. In a valve extractor for wells, a socket member carrying a depending screw, a block threaded on said screw, and cooperating means carried by the block and screw permitting rotation of the block on the screw in one direction, said cooperating means including a pawl carried by the upper edge of the block, and a longitudinal groove formed in the screw into which the pawl ratchets.

2. In a valve extractor for wells, a socket member carrying a depending screw having a longitudinally extending ratchet groove in one side thereof, a block threaded on said screw, a pin secured in the upper edge of said block and a wire pawl anchored on said pin and having an operating end extending into the ratchet groove in the screw permitting rotation in one direction of the screw block on the screw.

3. In a valve extractor for wells, a socket member carrying a depending screw, a block having longitudinally extending ribs threaded upon said screw, and cooperating means carried by the block and screw for permitting rotation of the block on the screw in one direction only, said cooperating means including a longitudinally extending groove formed in the screw, a pin secured in the upper face of one of said ribs, and a wire pawl anchored on said pin, said wire pawl having a depending leg engaging one side of said rib and a second leg bent to form a ratchet for engaging the groove in said screw.

In testimony whereof I affix my signature.

ROBERT L. WYCKOFF.